United States Patent
You

(10) Patent No.: US 11,419,306 B1
(45) Date of Patent: Aug. 23, 2022

(54) PET BACKPACK FOR FEEDING AND WATERING

(71) Applicant: Huiyun You, Guangdong (CN)

(72) Inventor: Huiyun You, Guangdong (CN)

(*) Notice: Subject to any disclaimer, the term of this patent is extended or adjusted under 35 U.S.C. 154(b) by 0 days.

(21) Appl. No.: 17/239,601

(22) Filed: Apr. 25, 2021

(30) Foreign Application Priority Data

Feb. 5, 2021 (CN) .......................... 202120333625.5

(51) Int. Cl.
*A01K 1/02* (2006.01)
*A01K 5/02* (2006.01)
*A01K 7/06* (2006.01)

(52) U.S. Cl.
CPC .............. *A01K 1/029* (2013.01); *A01K 5/025* (2013.01); *A01K 7/06* (2013.01)

(58) Field of Classification Search
CPC ... A01K 7/00; A01K 7/02; A01K 7/06; A01K 9/00; A01K 9/005; A45F 3/16; A45F 2003/166; B68C 1/00
USPC ..... 224/148.6, 575, 576, 153, 627, 659, 224
See application file for complete search history.

(56) References Cited

U.S. PATENT DOCUMENTS

| | | | |
|---|---|---|---|
| 5,465,885 A | 11/1995 | Wyatt | |
| 7,044,343 B2 | 5/2006 | Anue | |
| 10,548,361 B1 | 2/2020 | Suttman et al. | |
| 2008/0169321 A1* | 7/2008 | Fidrych | A45F 3/16 224/148.2 |
| 2016/0262525 A1* | 9/2016 | Lorbecki | A45F 3/16 |

* cited by examiner

*Primary Examiner* — Joshua E Rodden
*Assistant Examiner* — Henry Hooper Mudd

(57) ABSTRACT

The pet backpack for feeding and watering consists of a main body, a cover, a watering device, a feeding device, an hidden shelf, a first zipper, a first side bag, a second side bag and a strap. A top of the main body is provided with the cover, the watering device is arranged at the left side of the main body and the feeding device is arranged at the right side of the main body. The pet backpack for feeding and watering is provides the watering device at the left side of the main body and the feed device at the right side of the main body, which results in that the pet can be feeded and watered in the backpack. The pet backpack for feeding and watering saves time and effort, improves the use frequency and facilitates to travel with the pet.

8 Claims, 4 Drawing Sheets

PET BACKPACK FOR FEEDING AND WATERING

FIELD OF THE INVENTION

The invention relates to backpacks, and more particularly to a pet backpack for feeding and watering.

BACKGROUND OF THE INVENTION

Backpack refers to the bag on the back, which leads the fashion trend with various materials, for example, leather, plastic, polyester, canvas, nylon, cotton and linen etc. In the period of flaunting personality, simple, retro, cartoon and other styles also cater to the needs of fashionistas from different aspects. The styles of backpacks are also extended from traditional business bags, school bags, travel bags to pen bags, change bags, small sachets, etc. With the improvement of people's living standard, more and more families raise pets, among them the main are small animals, such as small dogs, cats and so on. When raising animals, people often need to take pets out. In order to prevent pets loss and facilitate the management of pets, people are used to wearing belts around pet's necks. The existing belt consists of a collar and a pull belt connected to the collar. Because the pulling power is all concentrated on the pet's neck, which is impact on the pet's neck heavily, the pet's neck is very uncomfortable, if the belt is used for a long time, it is easy to cause the pet's neck to inflame. And, when a raisers rides with a pet, it is very troublesome for bringing the pet with a belt and it can not guarantee the safety of pets.

At present, there are a variety of pet backpacks available on the market, however the functions of the existing pet backpacks are simple, the pet can not feeding or watering in the pet backpacks, which leads the low frequency of the usage of the pet backpacks, it is easy to be idle down and is not conducive to the best use of goods.

SUMMARY OF THE INVENTION

To overcome the shortcomings of the prior art, the object of the present invention is to provided a pet backpack for feeding and watering, which installs a watering device and a feeding device on the left side and the right side of the main body of the backpacks respectively, pet can be feeded and watered in the backpack. The pet backpack for feeding and watering saves time and effort, improves the use frequency, and facilitates to travel with the pet.

In order to achieve the above object, the present invention provides the following technical schemes:

The pet backpack for feeding and watering consists of a main body, a cover, an watering device, a feeding device, an hidden shelf, a first zipper, a first side bag, a second side bag and a strap. A top of the main body is provided with the cover, the watering device and the feeding device are arranged at the left side and the right side of the main body respectively. A bottom of the feeding device is provided with the hidden shelf. The first zipper is arranged under the cover. The first side bag is arranged under the watering device, the second side bag is arranged at a bottom of the hidden shelf. The strap is arranged on a back surface of the main body, a second zipper is arranged on a front surface of the main body, an inner side of the second zipper is provided with a first air permeable net, the left side of the main body is provided with a fixed hole, a through hole for water is arranged under the fixed hole, the cover is provided with a third zipper, an inner side of the third zipper is provided with a second air permeable net, a top of the second air permeable net is provided with a shading cloth.

The watering device includes a first fixed cap, a first rope, a ring, a bottle, a fixed clamp, a drinker, a discharging tube, a steel ball and a knob. A bottom of the first fixed cap is connected with an end of the first rope, the other end of the first rope is connected with the ring, the first fixed cap is sleeved with a neck of the bottle, a bottom of the bottle is connected with the drinker, the drinker is provided with the fixed clamp, a right side of the drinker is provided with the discharging tube, an outlet of the discharging tube is provided with the steel ball, a right side of the ring locks the knob.

The feeding device includes a second fixed cap, a second rope, a food box, an out-feeder. A bottom of the second fixed cap is provided with a second rope, the second fixed cap is sleeved on a top of the food box, a bottom of the food box is connected with the out-feeder, the bottom of the food box is provided with an outlet for food, an inner top of the out-feeder is provided with a baffle, a bottom of the baffle is provided with a pressing plate, an inner middle of the baffle is provided with a spring.

The hidden shelf includes an unfolded bottom plate, a folded support cloth, and the unfolded bottom plate connects the backpack body through the folded support cloth.

The right side of the main body is provided with a slot and a buckle. The slot and the buckle are used for fixing the second side bag covered with the second fixing cap to the main body.

Both of the shading cloth and the right side of the main body are provided with a first Velcro. The second air permeable net and the unfolded bottom plate are provided with a second Velcro, the first Velcro is used to match with the second Velcro.

The shading cloth is provided with the first Velcro, which is sticked with the second Velcro to fix the shading cloth on the second air permeable net.

A top of the cover is provided with a braided lifting ring which is used for convenient lifting backpack.

The back surface of the main body is provided with a shocking pad which has the functions of breathable and also has shock absorption effect.

Both sides of the inner surface of the baffle are provided with a limit block which is used for preventing excessive pressing of a press plate and resulting in a spring damage.

The side of the main body is provided with a third air permeable net which is used for backpack ventilation.

The working principle of the present invention:

The top of the main body is provided with the cover, the watering device and the feeding device are arranged at the left side and the right side of the main body respectively. A bottom of the feeding device is provided with the hidden shelf. The first zipper is arranged under the cover. The first side bag is arranged under the watering device, the second side bag is arranged at a bottom of the hidden shelf. The strap is arranged on a back surface of the main body, a second zipper is arranged on a front surface of the main body, an inner side of the second zipper is provided with a first air permeable net, the left side of the main body is provided with a fixed hole, a through hole for water is arranged under the fixed hole, the cover is provided with a third zipper, an inner side of the third zipper is provided with a second air permeable net, a top of the second air permeable net is provided with a shading cloth. The bottom of the first fixed cap is connected with a end of the first rope, the other end of the first rope is connected with a ring, the first fixed cap is sleeved with a neck of the bottle, a bottom of the bottle is connected with the drinker, the drinker is provided with a fixed clamp, a right side of the drinker is provided with the discharging tube, an outlet of the discharging tube is provided with the steel ball, a right side of the first ring is lock the knob. The bottom of the second fixed cap is provided with a second rope, the second fixed cap is sleeved on a top of the food box, a bottom of the food box is connected with the out-feeder, the bottom of the food box is provided with an outlet for food, an inner top of the out-feeder is provided with a baffle, a bottom of the baffle is provided with a pressing plate, an inner middle of the baffle is provided with a spring.

The knob passes through the fixing hole and the ring to connect to the fixed clamp so as to be fixed, the ring is matched with the first rope to fix the first fixed cap, the first fixed cap is used for fixing the bottle, the fixed clamp to is used for fixing the drinker to prevent the drinker to stirring and taking off, the drinker is inserted into the backpacks through the through hole for water, the discharging tube is matched with the steel ball for pet drinking, the second fixed cap is matched with the second rope to connect the main body to fix the food box, at the same time, the hidden shelf supports the out-feeder so that the pet can be feed in the backpack. The pet backpack for feeding and watering saves time and effort, improves the use frequency and facilitates to travel with the pet.

Adopt the above technical scheme, the advantages of the present invention are as follows: The pet backpack for feeding and watering is provides with the watering device at the left side of the main body and the feeding device at the right side of the main body, which results in that the pet can be feeded and watered in the backpack. The pet backpack for feeding and watering saves time and effort, improves the use frequency and facilitates to travel with the pet.

BRIEF DESCRIPTION OF THE DRAWINGS

In order to explain more clearly the embodiment of the present invention or the technical scheme in the prior art, a brief introduction is given below to the attached drawings needed in the embodiments or the prior art description. Obviously, the attached drawings are only some embodiments of the present invention. For those ordinary technical personnel in the art, other drawings can be obtained according to these drawings without paying creative labor.

DETAILED DESCRIPTION OF ILLUSTRATED EMBODIMENTS

Figure 1:
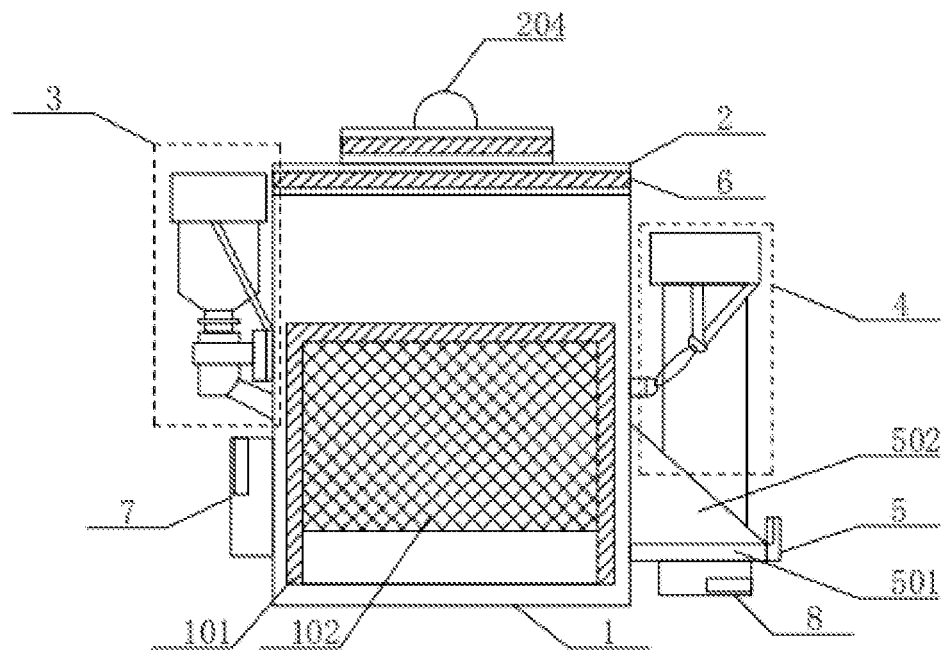
FIG. 1 is a schematic diagram of the pet backpack for feeding and watering according to the present invention.
Figure 2:
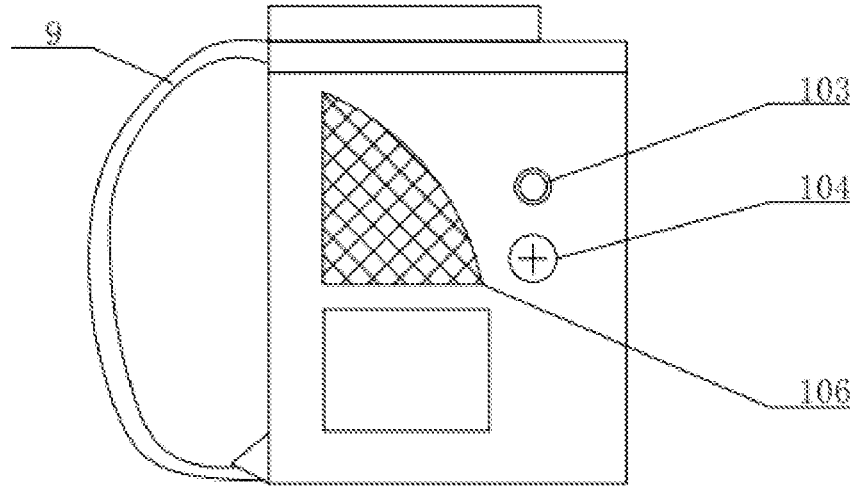
FIG. 2 is a schematic diagram of the left side of the pet backpack for feeding and watering according to the present invention.
Figure 3:
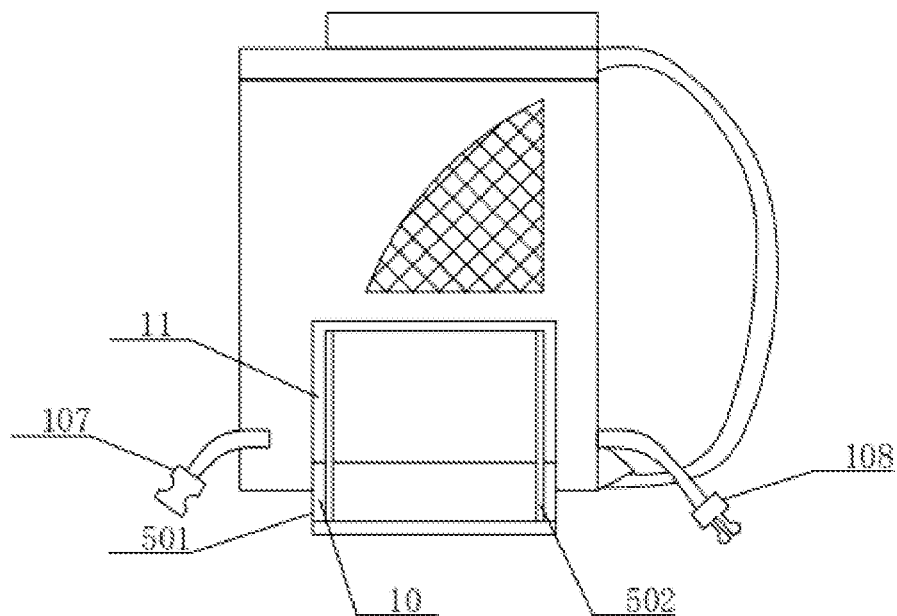
FIG. 3 is a schematic diagram of the right side of the pet backpack for feeding and watering according to the present invention.
Figure 4:
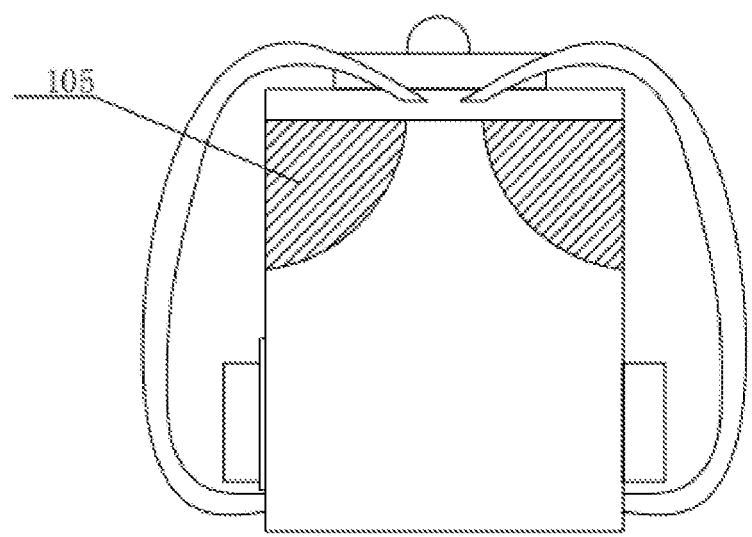
FIG. 4 is a schematic diagram of the back surface of the pet backpack for feeding and watering according to the present invention.
Figure 5:
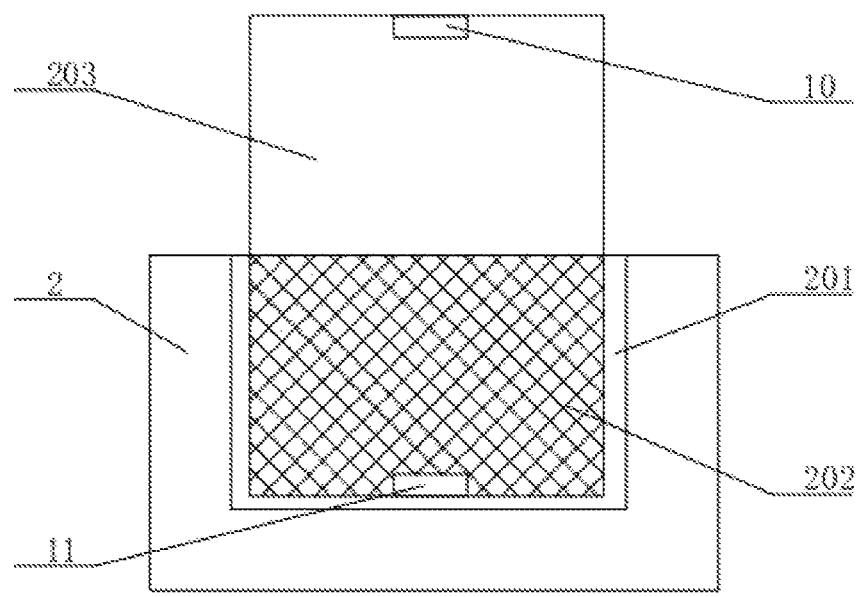
FIG. 5 is a schematic diagram of the cover of the pet backpack for feeding and watering according to the present invention.
Figure 6:
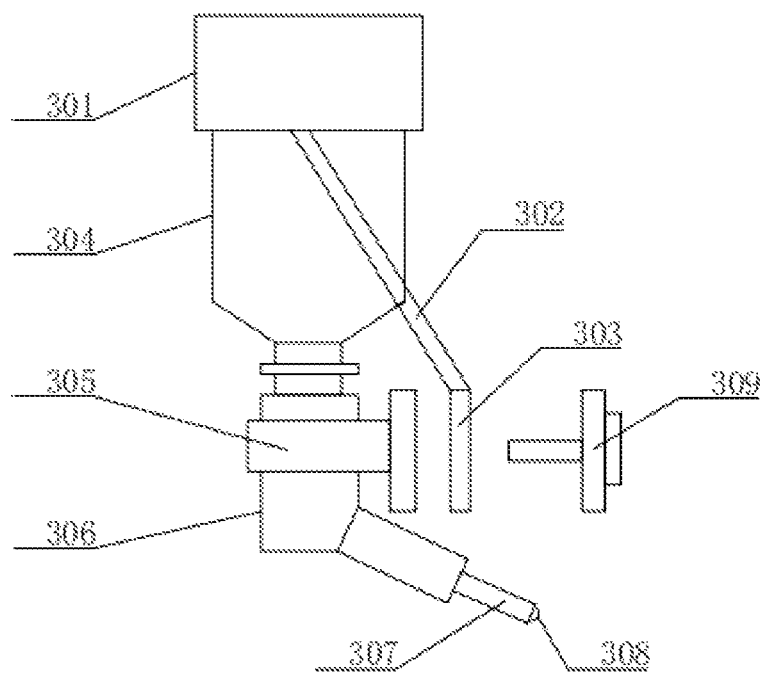
FIG. 6 is a schematic diagram of the watering device of the pet backpack for feeding and watering according to the present invention.
Figure 7:
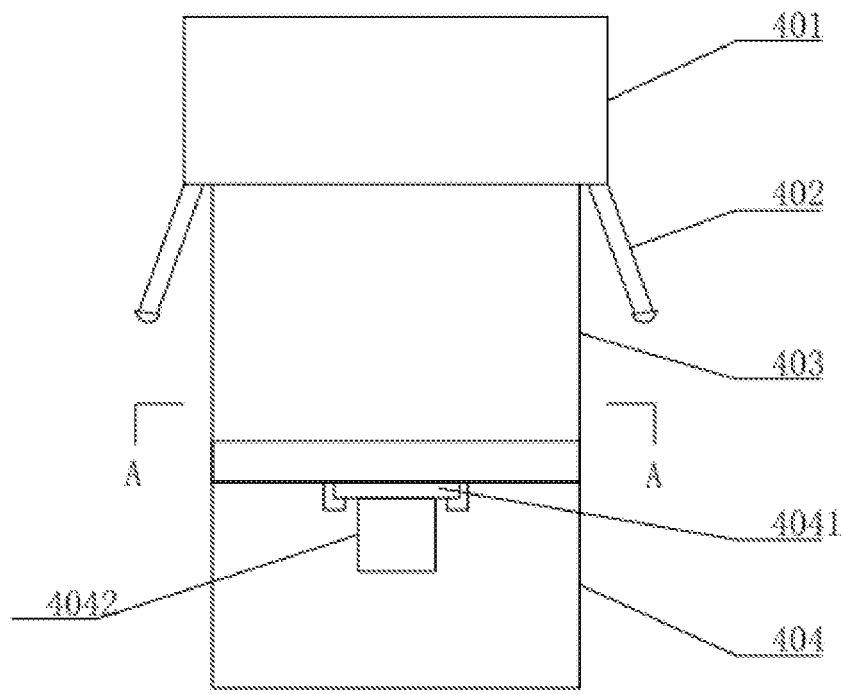
FIG. 7 is a schematic diagram of the feeding device of the pet backpack for feeding and watering according to the present invention.
Figure 8:
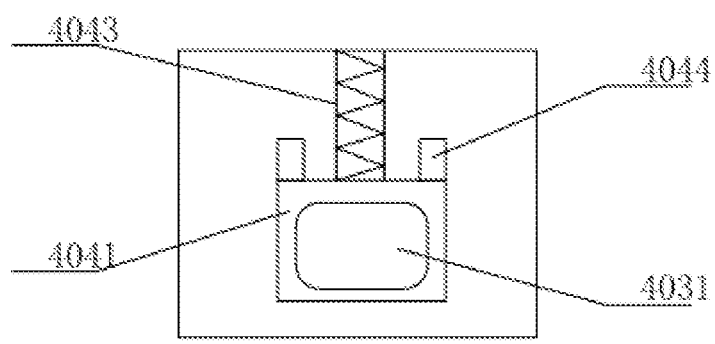
FIG. 8 is a sectional view along A-A line in FIG. 6.

Referring to FIG. 1 to FIG. 8, the pet backpack for feeding and watering according to the present invention includes a main body 1, a cover 2, a watering device 3, a feeding device 4, an hidden shelf 5, a first zipper 6, a first side bag 7, a second side bag 8 and a strap 9. A top of the main body 1 is provided with the cover 2, the watering device 3 is arranged at the left side of the main body 1 and the feeding device 4 is arranged at the right side of the main body 1. A bottom of the feeding device 4 is provided with the hidden shelf 5. The first zipper 6 is arranged under the cover 2. The first side bag 7 is arranged under the watering device 3, the second side bag 8 is arranged at a bottom of the hidden shelf 5. The strap 9 is arranged on a back surface of the main body 1, a second zipper 101 is arranged on a front surface of the main body 1, an inner side of the second zipper 101 is provided with a first air permeable net 102, the left side of the main body 1 is provided with a fixed hole 103, a through hole for water 104 is arranged under the fixed hole 103, the cover 2 is provided with a third zipper 201, an inner side of the third zipper 201 is provided with a second air permeable net 202, a top of the second air permeable net 202 is provided with a shading cloth 203.

The watering device 3 includes a first fixed cap 301, a first rope 302, a ring 303, a bottle 304, a fixed clamp 305, a drinker 306, a discharging tube 307, a steel ball 308 and a knob 309. A bottom of the first fixed cap 301 is connected with a end of the first rope 302, the other end of the first rope 302 is connected with the ring 303, the first fixed cap 301 is sleeved with a neck of the bottle 304, a bottom of the bottle 304 is connected with the drinker 306, the drinker 306 is provided with the fixed clamp 305, a right side of the drinker 306 is provided with the discharging tube 307, an outlet of the discharging tube 307 is provided with the steel ball 308, a right side of the ring 303 locks the knob 309.

The feeding device 4 includes a second fixed cap 401, a second rope 402, a food box 403, an out-feeder 404. A bottom of the second fixed cap 401 is provided with a second rope 402, the second fixed cap 401 is sleeved on a top of the food box 403, a bottom of the food box 403 is connected with the out-feeder 404, the bottom of the food box 403 is provided with an outlet for food 4031, an inner top of the out-feeder 404 is provided with a baffle 4041, a bottom of the baffle 4041 is provided with a pressing plate 4042, an inner middle of the baffle 4041 is provided with a spring 4043.

The hidden shelf 5 includes an unfolded bottom plate 501, a folded support cloth 502, and the unfolded bottom plate 501 connects the main body 1 through the folded support cloth 502.

The right side of the main body 1 is provided with a slot 107 and a buckle 108. The slot 107 and the buckle 108 are used for fixing the second side bag 8 covered with the second fixing cap 401 to the main body 1.

The shading cloth 203 and the right side of the main body 1 are provided with a first Velcro 10. The first Velcro 10 is used to match with a second Velcro 11.

The second air permeable net 202 and the unfolded bottom plate 50 are provided with the second Velcro 11. The second Velcro 11 is used for sticking with the first Velcro 10.

The shading cloth 203 is provided with the first Velcro 10, which is matched with the second Velcro 11 to fix the shading cloth 203 on the second air permeable net 202.

A top of the cover 2 is provided with a braided lifting ring 204 which is used for convenient lifting backpack.

The back surface of the main body 1 is provided with a shocking pad 105 which has play the role of breathable and also has shock absorption effect.

The inner end of the baffle 4041 is provided with a limit block 4044 which is used for preventing excessive pressing of the press plate 4042 and resulting in the spring 4043 to damage.

The side of the main body 1 is provided with a third air permeable net 106 which is used for backpack ventilation.

The working principle of the present invention:

The top of the main body is provided with the cover, the watering device 3 and the feeding device 4 are arranged at the left side and the right side of the main body 1 respectively. A bottom of the feeding device 4 is provided with the hidden shelf 5. The first zipper 6 is arranged under the cover 2. The first side bag 7 is arranged under the watering device 3, the second side bag 8 is arranged at a bottom of the hidden shelf 5. The strap 9 is arranged on a back surface of the main body 1, a second zipper 101 is arranged on a front surface of the main body 1, an inner side of the second zipper 101 is provided with a first air permeable net 102, the left side of the main body 1 is provided with a fixed hole 103, a through hole for water 104 is arranged under the fixed hole 103, the cover 2 is provided with a third zipper 201, an inner side of the third zipper 201 is provided with a second air permeable net 202, a top of the second air permeable net 202 is provided with a shading cloth 203. The bottom of the first fixed cap 301 is connected with a end of the first rope 302, the other end of the first rope 302 is connected with a ring 303, the first fixed cap 301 is sleeved with a neck of the bottle 304, a bottom of the bottle 304 is connected with the drinker 306, the drinker 306 is provided with a fixed clamp 305, a right side of the drinker 306 is provided with the discharging tube 307, an outlet of the discharging tube 307 is provided with the steel ball 308, a right side of the first ring 303 locks the knob 309. The bottom of the second fixed cap 401 is provided with a second rope 402, the second fixed cap 401 is sleeved on a top of the food box 403, a bottom of the food box 403 is connected with the out-feeder 404, the bottom of the food box 403 is provided with an outlet for food 4031, an inner top of the out-feeder 404 is provided with a baffle 4041, a bottom of the baffle 4041 is provided with a pressing plate 4042, an inner middle of the baffle 4041 is provided with a spring 4043. The knob 309 passes through the fixing hole 103 and the ring 303 to connect to the fixed clamp 305 so as to be fixed, the ring 303 is matched with the first rope 302 to fix the first fixed cap 301, the first fixed cap 301 is used for fixing the bottle 304, the fixed clamp 305 to is used for fixing the drinker 306 to prevent the drinker 306 to stirring and taking off, the drinker 306 is inserted into the mainbody 1 through the through hole for water 104, the discharging tube 307 is matched with the steel ball 308 for pet watering, the second fixed cap 401 is matched with the second rope 402 to connect the main body 1 to fix the food box 403, at the same time, the hidden shelf 5 supports the out-feeder 404 so that the pet can be feed in the backpack. The pet backpack for feeding and watering saves time and effort, improves the use frequency and facilitates to travel with the pet.

Adopt the above technical scheme, the advantages of the present invention are as follows: The pet backpack for feeding and watering is provides the watering device 3 at the left side of the main body 1 and the feeding device 4 at the right side of the main body 1, which results in that the pet can be feeded and watered in the backpack. The pet backpack for feeding and watering saves time and effort, improves the use frequency and facilitates to travel with the pet.

In the description of the present invention, it needs to be explained that the azimuth or position relationship indicated by the terms "center", "upper", "lower", "left", "right", "vertical", "horizontal", "inside", "outside" is based on the azimuth or position relationship shown in the attached figure, only for the convenience of describing the present invention and simplifying the description, rather than indicating or implying that the device or element must have a specific orientation, be constructed and operated in a specific orientation, so it can not be understood as a limitation to the present invention. furthermore, the terms "first", "second", "third" are used only for descriptive purposes and can not be understood as indicating or implying relative importance.

The above mentioned is only used to explain the technical scheme of the present invention, not to limit, other modifications or equivalent replacements made by ordinary technicians in the field to the technical scheme of the present invention, As long as it is not divorced from the spirit and scope of the technical scheme, it shall be covered in the claim scope of the present invention.

What is claimed is:

1. A pet backpack for feeding and watering, comprising a main body, a cover, an watering device, a feeding device, an hidden shelf, a first zipper, a first side bag, a second side bag and a strap; a top of said main body is provided with said cover, said watering device and said feeding device are arranged at a left side and a right side of said main body respectively; a bottom of said feeding device is provided with said hidden shelf; said first zipper is arranged under said cover; said first side bag is arranged under said watering device, said second side bag is arranged at a bottom of said hidden shelf; said strap is arranged on a back surface of said main body, a second zipper is arranged on a front surface of said main body, an inner side of said second zipper is provided with a first air permeable net, said left side of said main body is provided with a fixed hole, a through hole for water is arranged under said fixed hole, said cover is provided with a third zipper, an inner side of said third zipper is provided with a second air permeable net, a top of said second air permeable net is provided with a shading cloth;

wherein said watering device includes a first fixed cap, a first rope, a ring, a bottle, a fixed clamp, a drinker, a discharging tube, a steel ball and a knob; a bottom of said first fixed cap is connected with a end of said first rope, said other end of said first rope is connected with said ring, said first fixed cap is sleeved with a neck of said bottle, a bottom of said bottle is connected with said drinker, said drinker is provided with said fixed clamp, a right side of said drinker is provided with said discharging tube, an outlet of said discharging tube is provided with said steel ball, a right side of said ring locks said knob;

wherein said feeding device includes a second fixed cap, a second rope, a food box, an out-feeder; a bottom of said second fixed cap is provided with a second rope, said second fixed cap is sleeved on a top of said food box, a bottom of said food box is connected with said out-feeder, said bottom of said food box is provided with an outlet for food, an inner top of said out-feeder is provided with a baffle, a bottom of said baffle is provided with a pressing plate, an inner middle of said baffle is provided with a spring;

wherein said hidden shelf includes an unfolded bottom plate, a folded support cloth, and said unfolded bottom plate connects said backpack body through said folded support cloth.

2. The pet backpack for feeding and watering according claim 1, wherein said right side of said main body is provided with a slot and a buckle.

3. The pet backpack for feeding and watering according claim 1, wherein said shading cloth is provided with a first hook and loop material, and said right side of said main body is provided with a second hook and loop material; said first hook and loop material is sticked with said second hook and loop material.

4. The pet backpack for feeding and watering according claim 1, wherein said second air permeable net is provided with a first hook and loop material, and said unfolded bottom plate is provided with a second hook and loop material; said first hook and loop material is sticked with said second hook and loop material.

5. The pet backpack for feeding and watering according claim 1, wherein a top of said cover is provided with a braided lifting ring.

6. The pet backpack for feeding and watering according claim 1, wherein said back surface of said main body is provided with a shocking pad.

7. The pet backpack for feeding and watering according claim 1, wherein said inner middle of said baffle is provided with a limit block.

8. The pet backpack for feeding and watering, according claim 1, wherein a side of said main body is provided with a third air permeable net.

* * * * *